United States Patent [19]
DuCatte, Jr.

[11] Patent Number: 5,917,989
[45] Date of Patent: Jun. 29, 1999

[54] DEVICE AND METHOD FOR RECORDING, EDITING AND DISPLAYING MOTION-SIMULATING MOVING PICTURES

[76] Inventor: Robert F. DuCatte, Jr., 178 Martins Hill Rd., Ravena, N.Y. 12143

[21] Appl. No.: 08/855,352

[22] Filed: May 13, 1997

[51] Int. Cl.⁶ .................................................. H04N 5/76
[52] U.S. Cl. ................................ 386/52; 386/64; 386/122
[58] Field of Search ........................................ 386/4, 36, 45, 386/52, 64, 122; 360/13; 369/83; 345/328, 327; 348/118, 119, 120; H04N 5/76, 5/92, 9/79

[56] References Cited

U.S. PATENT DOCUMENTS

| | | | |
|---|---|---|---|
| 2,861,806 | 11/1958 | Disney | 472/60 |
| 4,695,135 | 9/1987 | Den Exter Blokland et al. | 350/452 |
| 4,866,530 | 9/1989 | Kalua | 340/716 |
| 5,237,648 | 8/1993 | Mills et al. | 345/328 |
| 5,339,393 | 8/1994 | Duffy et al. | 386/52 |
| 5,388,197 | 2/1995 | Rayner | 345/328 |
| 5,448,287 | 9/1995 | Hull | 348/39 |
| 5,509,806 | 4/1996 | Ellsworth | 434/29 |
| 5,664,087 | 9/1997 | Tani et al. | 345/328 |
| 5,682,326 | 10/1997 | Klingler et al. | 345/328 |
| 5,760,767 | 6/1998 | Shore et al. | 345/328 |
| 5,781,188 | 7/1998 | Amiot et al. | 345/328 |

Primary Examiner—Thai Tran
Attorney, Agent, or Firm—Jay R. Yablon

[57] ABSTRACT

This Device and Method for Recording, Editing and Displaying Motion-Simulating Moving Pictures begins with the recording of opposite perspective views by stationing recording devices in an opposite facing manner on a movable platform. As the recording devices are moved in a horizontal motion, they capture images as they move past, thus creating moving picture images. The synchronized recording of these opposite perspective views alleviates cumbersome and expensive image editing to achieve the desired results. The ensuing editing processes starts with creative splicing, breaks, etc., along with the adjustments that will bring the images to as near broadcast quality as possible. Once this editing is complete, and after a master copy is stored, new data is added through editing to add advertising or educational/public service messages, and/or special effects. The next generation of editing involves sectioning, i.e., splitting each side sequence of images into portions which conform in size and relative dimension to image display screens the image portions will later be displayed on. As the portions are sectioned, they are stored on a storage device that later can be played simultaneously with all other corresponding portions to reconstitute the original recorded opposite perspective moving views, through an appropriate control mechanism.

19 Claims, 4 Drawing Sheets

DEVICE AND METHOD FOR RECORDING, EDITING AND DISPLAYING MOTION-SIMULATING MOVING PICTURES

FIELD OF THE INVENTION

This invention relates generally to the field of moving picture recording, editing and display, and specifically, provides a novel way of recording, editing and displaying moving pictures taken from opposite perspectives so as to simulate realistic motion.

BACKGROUND OF THE INVENTION

Since the time moving pictures were invented there have been devices and exhibits which attempt to simulate motion in a stable environment. The advent of computer technology has allowed the development of many systems using high-speed processors and video display devices to simulate motion, but most, if not all, concentrate on the apparatus' ability to trick the viewer into feeling the motion, and/or the device's intended use is to create a simulated environment where true reality is not a factor. Thus, while the technology and scope of simulated motion applications has increased dramatically since motion pictures were invented and although the computer has given simulated motion creators great flexibility in their creative work, the prior art often neglects to focus on the actual process of recording, editing and generating the image to ultimately be viewed, and the impact of this process on ease of production and the quality and realism of the ultimate viewed image.

For example, U.S. Pat. No. 2,861,806, issued Nov. 5, 1958 to Walter Disney, describes a rocket ship amusement apparatus, housed in a building, which has viewing screens on the top and bottom. In conjunction with movement of the seats, films are projected which can be viewed through the screens giving the illusion of space travel. This patent does not explain, however, how these films are created, edited and generated, and how that process affects the ultimate viewed product or the cost and effort of producing it.

U.S. Pat. No. 5,509,806, issued Apr. 23, 1996 to Thayne N. Ellsworth, describes a portable multiple module simulator which allows viewers to view their real surroundings, and simulate take-off with movement and travel through simulated space. Ellsworth utilizes video cameras attached to a boom which transmit live images to viewers. But he doesn't explain which cameras transmit to which screens or, more importantly, explain how the editing transition from recorded image to displayed image is achieved.

U.S. Pat. No. 5,448,287, issued Sep. 5, 1995 to Andrea S. Hull, describes a system of video display which creates the illusion that a viewer is inside moving action. The description fails to explain though, how the images are generated in respect to crucial elements such as perspective, continuity and movement.

A further and consistent drawback to the prior art related to motion simulation is its practicality in relation to cost. Defense department flight training simulators, for example, are truly advanced and of high quality and realism, but their use in ordinary commerce for entertainment is prohibitive.

Video display technology has seen significant advances recently, with the improvements in digital compression technology enabling greater use and flexibility in the editing and processing areas. As memory and storage capacities along with processing speed continue to extend the ability to digitize, store, and manipulate moving video data in computers, new ways will emerge to eliminate the defects of prior inventions related to moving picture image display technology.

For example, a new technology has emerged recently with the creation of the video wall. This technology usually starts with a single image, which is then processed so that segments of the image are sent to separate image screens contiguously configured so as to reconstitute the original image. Blokland et. al., U.S. Pat. No. 4,695,135, and Kalua, U.S. Pat. No. 4,866,530, have disclosed technical improvements useful in the video wall. But again, these disclosures omit anything about how the images displayed are recorded and edited precedent to display, and the impact on quality, realism and cost.

In short, creating the illusion of motion has seemingly been tried in countless ways over the years with the emphasis being mainly centered on the processing and display devices utilized. Because the human brain is not easily fooled with illusions, most of these prior devices have failed to properly match the processing and display devices with appropriate raw data or footage that realistically create an adequate illusion or feeling of motion, and that is easy to use and low cost.

OBJECTS OF THE INVENTION

It is therefore a first object of the current invention to provide a realistic illusion of motion in an enclosed structure using a data or moving picture image generating technique which can be manipulated to fit the needs of the editing or processing process, and which can be manipulated to correctly match raw data to the final display configuration.

It is further object of the invention to record opposite perspective scenes and generate motion by moving the platform upon which the recorder or recorders are stationed.

It is a further object of the invention to enable the creator of simulated motion video to edit and store a master or pure copy of the scenes for future differentiated uses.

It is a further object of this invention to utilize moving picture image editing technology to configure the images to be transmitted to image display devices intended to replicate the impact and effect of windows on various movable vehicles.

It is a further object of this invention to utilize moving picture image editing technology to easily add data for the purpose of selling advertising exposure of various types, or the promotion of educational and or public service references.

It is a further object of this invention to display real and/or artificially-created, or recorded, opposite perspective moving scenes on opposite facing image display devices configured to reconstitute continuous horizontal images onto or into opposite facing walls in an enclosed structure, or optionally, to allow single-sided display when and if desired.

It is a further object of this invention to produce and record dual, real-time, opposite perspective, moving views of real or artificially created scenery.

It is a further object of this invention to provide the illusion of motion from within an enclosed structure designed to replicate a railroad dining car, a cruise ship, trolley car, submarine, aircraft, spacecraft, or any other moving vehicle.

SUMMARY OF THE INVENTION

These and other objects are accomplished by recording opposite perspective scenes while moving the reording devices in a horizontal and stable manner in order to record moving picture images of said scenes. These moving picture images are then manipulated in numerous ways beginning with the editing functions associated with creating broadcast-quality viewable images. Said images are recorded as or combined (e.g. digitally spliced) into a single, contiguous master image for each side, then edited to desired length, form, time sequence, continuity and relevant speeds and gradation to conform each opposite perspective moving picture image sequence to the other matching moving picture image sequence. When a full sequence of opposite perspective moving picture images are edited, the edited master is then stored for future copies to be utilized. After this primary editing is completed, these edited sequences may be edited again (secondary editing) by adding data in the form of advertising or educational/public service references. At this point, it becomes less important to adhere to time and conformity coding, since each side perspective moving picture image may absorb different data without disturbing the realism or continuity of the images.

Once the primary and secondary creative editing stages are complete—and these stages may be multi-generational—the final editing process commences with the sectioning (splitting) of each side master image into separate partial images, which are recorded separately on an appropriate storage device and which can later be transmitted to contiguously-configured image display devices which when fully operational will reconstitute and simulate the full opposite perspective moving picture images as they were originally recorded.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

Figure 1:
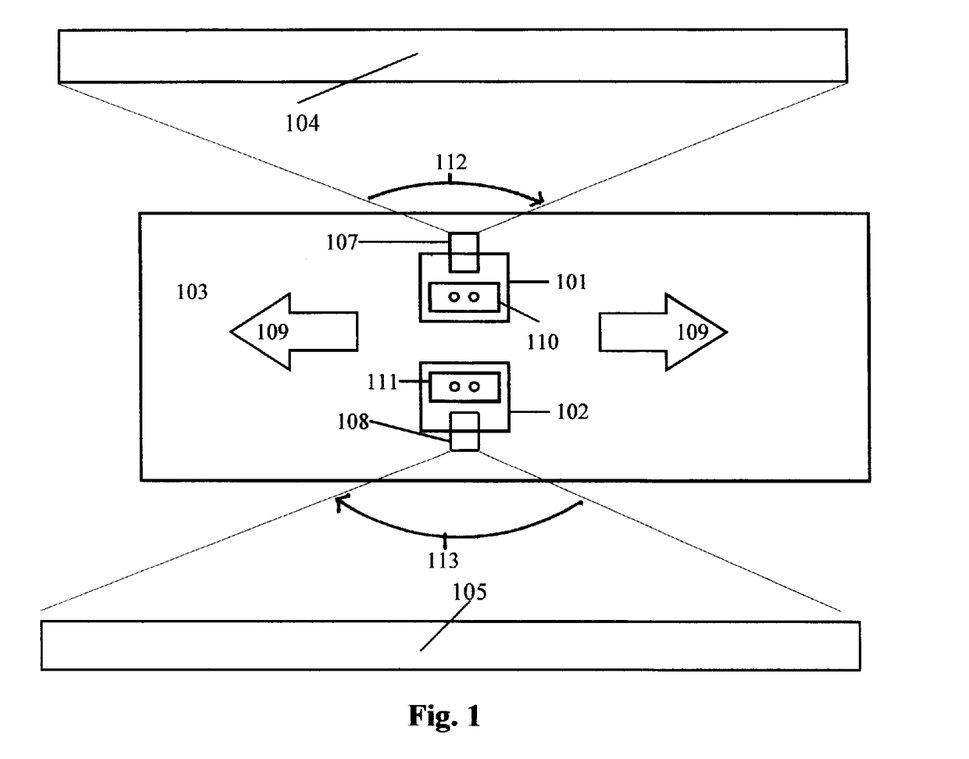
FIG. 1 depicts a birds-eye view of the preferred configuration for the recording process, recording a single master image for each side.

FIG. 1 is a birds-eye view of the preferred configuration for the recording process. Moving picture image recording devices 101 and 102, such as movie cameras, video cameras, digital video cameras, or combinations thereof, utilizing suitable moving picture image recording media 110 and 111 such as film, tape, digital storage, etc., are positioned back to back as shown. These are placed upon a platform 103 or other suitable device which maintains their relative back-to-back orientation, and enables them to be moved together. This platform 103 could, for example, be a railroad flatcar, an automobile, a dolly cart on wheels, a boat, or any mechanism capable of generating horizontal motion with an ample degree of control, consistency, and continuity. Image perspective viewers 107 and 108, e.g. lenses, are calibrated and strategically stationed upon the moving picture image recording devices 101 and 102 to record as closely as possible, opposite perspective scenes 104 and 105, respectively. These viewers 107 and 108 are of focal and optical calibrations to allow for very wide angle views without distorting image proportions relative to what is normally perceived by the human eye. Although creative license is an option in the recording process, it is an object of this invention to create highly-realistic illusions of motion with realistic moving picture images of the scenery.

These said opposite perspective images are horizontally recorded in motion as the platform 103 and hence the moving picture image recording devices 101 and 102 are horizontally moved in either direction as shown by the arrows 109. Thus, the direction of motion is essentially perpendicular to the directions in which the image recorders 101 and 102, and their viewers 107 and 108, are pointed to capture the scenes 104 and 105. Said opposite perspective scenes 104 and 105, encompass very wide angle horizontal fields of view 112 and 113, up to 180 degrees.

Figure 2:
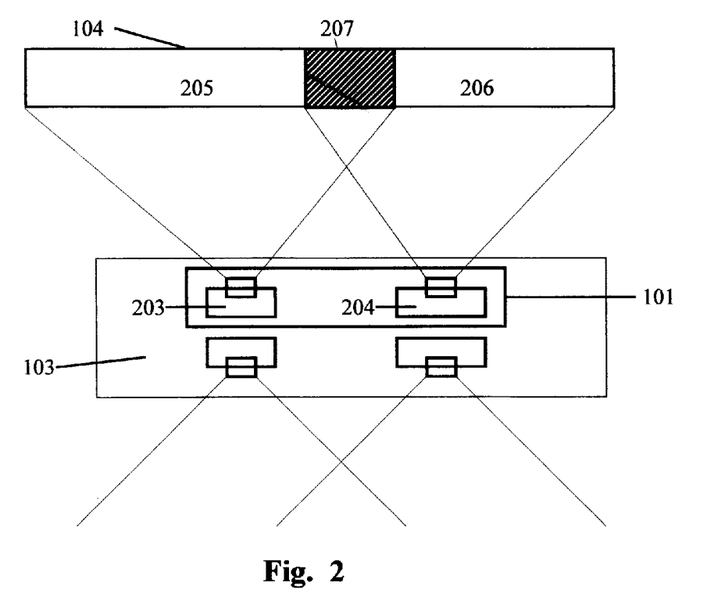
FIG. 2 illustrates the use of a plurality of moving picture image recording devices on each side of the recording process configuration, wherein these images are then digitally spliced together into a single master image.

In order to obtain the desired very wide recording angle (i.e. fields of view 112 and 113), it may be necessary or desired, as a variation of the preferred embodiment of the invention, to use a plurality of moving picture image recording devices on each side. This is shown in FIG. 2, for example, by two moving picture image recording devices 203 and 204 in place of the single device 101 from FIG. 1. Similar, unlabelled recording devices are positioned to record the opposite side scene. Device 203 records scene 205, and device 204 records scene 206, wherein 205 and 206, in combination, capture the entire scene 104 of FIG. 1. These multiple recorders are stationed horizontally parallel and equal in relation to height, angle and distance to actual scenery view field. If multiple recorders are utilized on each side in this way, the horizontal field of view of the lenses on each side should be set up to overlap by a small amount (e.g, less than 5 degrees, and at least one pixel), as shown by the diagonally-shaded overlap area 207.

While FIG. 2 depicts two moving picture image recording devices on each side, it is of course possible to use any desired number of moving picture image recording devices consistent with the spirit of this invention and its associated disclosure and claims. Similarly, while FIGS. 1 and 2 show back-to-back recording on opposite sides, it is envisioned that the techniques described herein could be utilized to record images on one side by the very obvious expedient of simply eliminating the recording device(s) for one side.

Once the images have been recorded as described in connection with FIGS. 1 and 2, the recorded images are then edited. The editing process encompasses three major steps starting with the necessary time, motion and characteristics synchronization to provide the opposite perspective images the most true to real life look. Creative splices, or cuts will generally be done equally to both images to ensure continuity.

The first, primary editing step, is completed with the recording and storing of the master or pure opposite perspective images, including the joining of multiple single-side images together into a single, continuous image if the recording is performed with multiple recording devices according to FIG. 2. In other words, the two (or possibly more) scenes 205 and 206 are joined into a single image as if they had been recorded as the single scene 104 of FIG. 1, by eliminating any redundant data in the overlapping region 207, and then splicing (via digital technology means) 205 and 206 into a single master scene image. Then, irrespective of whether recording was done according to FIG. 1 or FIG. 2, the master images are digitally edited and enhanced for sharpness, color, synchronization and any other aspects that create an optimal image for the desired viewing purpose.

The second, secondary editing step comprises additional editing which adds new data not recorded with the original scenery and not introduced during the primary editing phase, for example, advertising, announcements, and/or special effects. There may be many generations of additional data added or changed at this point, and editing in the digital form will allow this to be done without loss of quality.

The third step in the editing process involves the sectioning or splitting of the images precedent to the ultimate display of the edited images.

Figure 3:
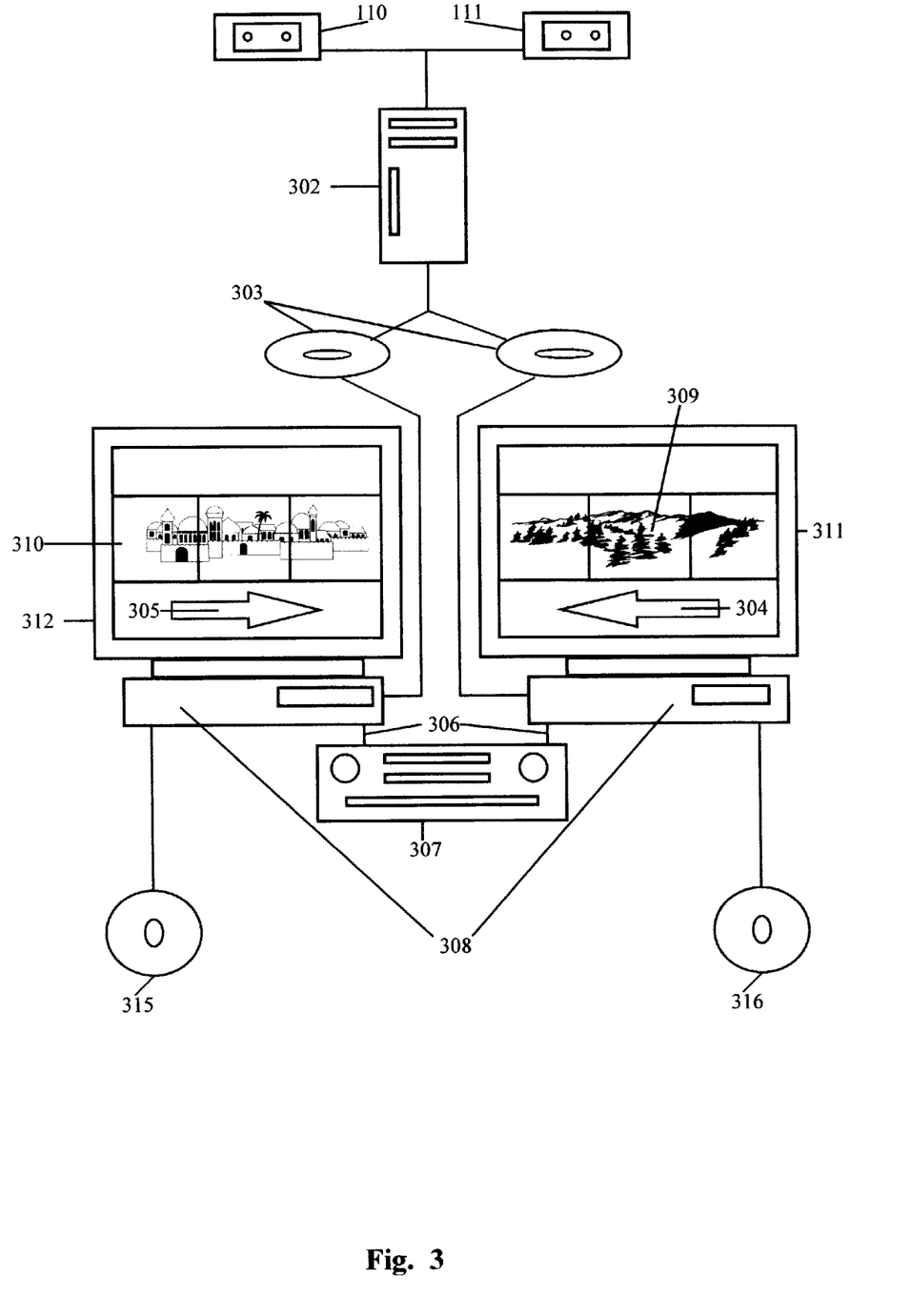
FIG. 3 illustrates the editing of the master images captured by the recording process of FIGS. 1 and 2.

FIG. 3 is a schematic illustration of the editing process which takes the images 104 and 105 as captured on the moving picture image recording media 110 and 111, and manipulates them closer to the desired form. The recorded images as captured on media 110 and 111 are digitized by a digitizing mechanism 302 (if they are not already in digital form on 110 and 111) and stored on a digital storage medium 303. This digital storage medium may be a computer hard drive, CD-ROM, laser disk, video tape, digitized tape, or any other suitable, digital data storage mechanism available presently or in the future. Such digital storage medium is most practical for precisely editing the data with minimal data loss. The moving scenes 104 and 105, once digitized as captured images 302, may be stored on a single digital storage medium, multiple digital storage media, or, as illustrated here by way of example, on a separate media device for each image.

The digital storage medium 303 is now accessed by an editing mechanism 308, which is in the preferred embodiment is a computer with a hard drive capable of handling large quantities of data and processing capability fast enough to edit real time moving picture images, but could also be an editing suite based on another method or technology. Display monitors 311 and 312 connected with the editing mechanism 308 display the images 310 (from 104) and 311 (from 105) as digitized on 303. The arrows 304 and 305 represent the opposite directions the images will move due to their opposite perspective recordings. The editing mechanism 308 is controlled by an editing and control means 307 via one or more connections 306. This editing control means will include whatever user tools, not shown, are needed to control editing, e.g., keyboard, mouse, etc., as well as supporting editing hardware and/or software.

First, if recording was performed according to the variation of FIG. 2, then the moving picture image recording media 110 and 111 will each in fact be two or more media, and each of the storage media 303 will have two or more partially overlapping (e.g. 207) scene images (e.g. 205 and 206). Thus, in this variation, separate images are joined (spliced) into a single master image and the redundant data in overlap areas such as 207 are eliminated.

Once a single master image is obtained, either directly as in FIG. 1 or following digital splicing in connection with FIG. 2, that image may be sharpened or enhanced and special effects may be added. Thereafter, in the secondary editing phase, special effects, advertising or other promotional features may be added. It is important to note that all the editing is performed on each of the two opposite images 309 and 310, with each of these images retained as whole (unsplit) image, irrespective of whether the image was recorded according to FIG. 1 and was therefor unsplit from the start, or was recorded according to FIG. 2 and therefore digitally spliced into a single image.

Once these edits are complete, the whole, unsplit images are stored on a second digital storage medium 315 and 316 (software, hardware, disk, tape etc.) which will act as the master file for the edited images. These edited images 315 and 316 may be further processed, as desired, with additional editing.

Figure 4:
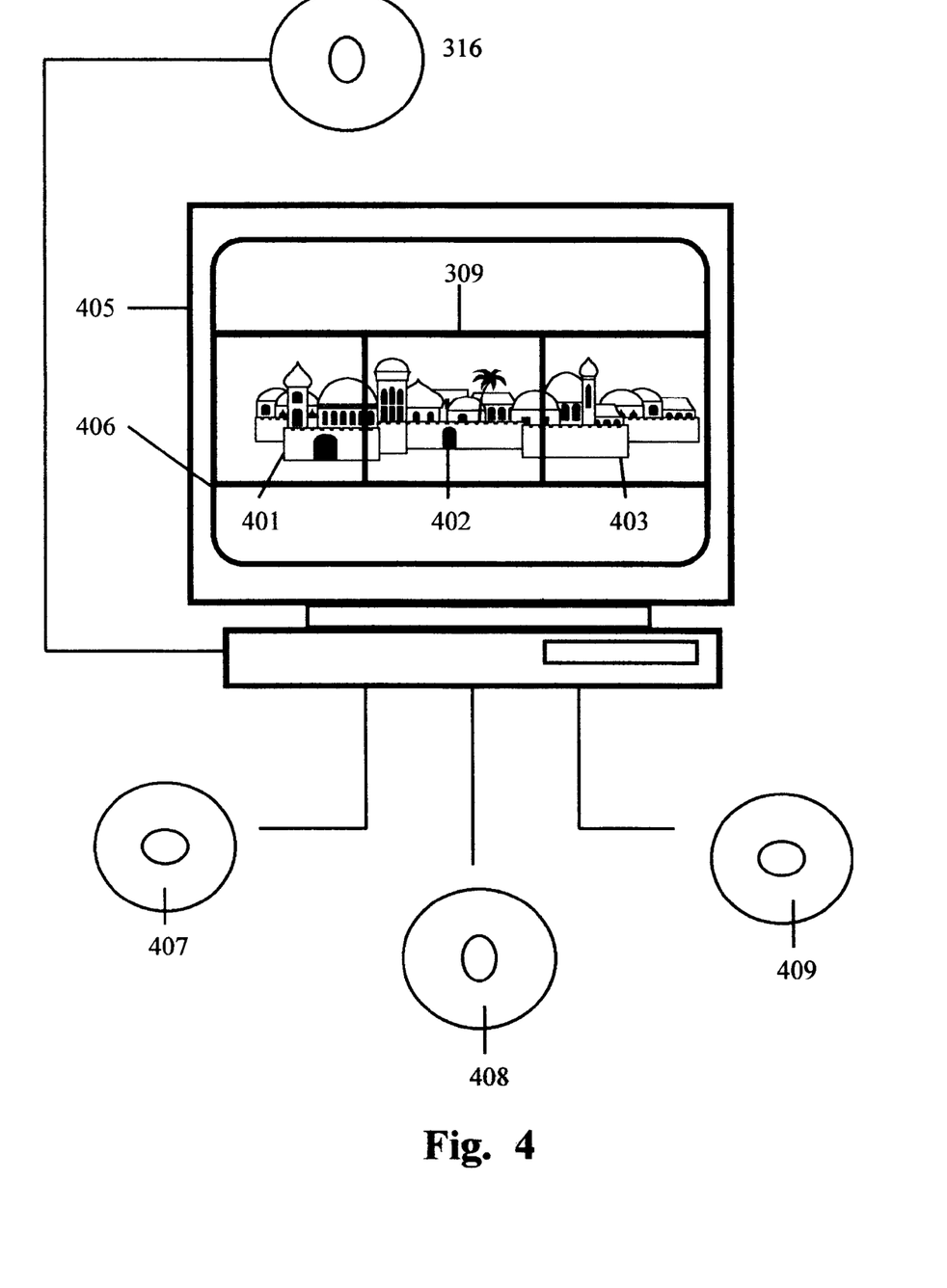
FIG. 4 illustrates the splitting of master images into a plurality of sectional images.

FIG. 4 illustrates, for a single side (the process is the same for each side), the process used to split or segment the master image or images into a plurality of separate but contiguous images. Using for input the storage medium 316 which contains the master, single-side perspective, wide angle edited image 309, the editor splits this image 309 into a plurality of lateral images, designated 401, 402 and 403, and records each separate new (smaller) section to a new set of sectional image storage media. So sectional image 401 is recorded to sectional image storage medium 407, sectional image 402 is recorded to sectional image storage medium 408, and section image 403 is recorded to sectional image storage medium 409. Media represented by 407, 408 and 409, may again be in many forms, for example, digital video disks, CD-ROM, video tapes, laser disks, digital tape drives, or any storage and playback device available presently or in the future that allows images to be stored and replayed at near-broadcast quality.

While FIG. 4 illustrates the splitting of the master image into three sectional images, it is fully contemplated by this disclosure and its associated claims that the master images can in fact be split into a plurality of any number of sectional images. Similarly, while three distinct "logical" media 407, 408, and 409 are illustrated here, it would be obvious to someone of ordinary skill to, for example, write all sectional images to a single disk (i.e., a single "physical" medium) if said disk has enough capacity, and even to write the sectional images to the same disk that contains the unsplit master, again, assuming enough capacity. Conversely, if a single master, and/or each of the sectional images is very large, full storage of an image to one "logical" medium may require more than one "physical" medium, e.g., more than one disk.

Further, for very wide images (for example, a master image that will be sectioned (split) into, say, nine sectional images), the displays 311, 312, 405 may not themselves have sufficient horizontal dimension to properly display the entire wide angle image, and multiple monitors may be required. Or, the manner of displaying the entire wide angle image on a single screen may be varied so that, e.g., the leftmost ⅓ of the master appears on the upper ⅓ of the screen, the middle ⅓ of the master appears on the middle ⅓ of the screen, and the rightmost ⅓ of the master appears on the bottom ⅓ of the screen. Given the advanced state and infinite flexibility of computer software today, many other variations will occur to someone of ordinary skill which fall within the scope of this disclosure and its associated claims.

The key point in all of the above, irrespective of the "physical" configuration of computer, recording, storage and display hardware and software used to practice this invention, is that 1) each wide angle image is recorded as or combined into a single "logical" master representation for each perspective side image, 2) all editing is performed on that single, "logical" master representation, 3) once all desired editing is complete, the "logical" master representation is then sectioned into discrete sectional images precedent to display, and 4) these sectional images are then displayed one a corresponding series of image display devices (e.g. screens). By performing all editing on a single master in this manner and then splitting the master, ease of editing is vastly increased, and the cost of editing is significantly reduced.

Figure 5:
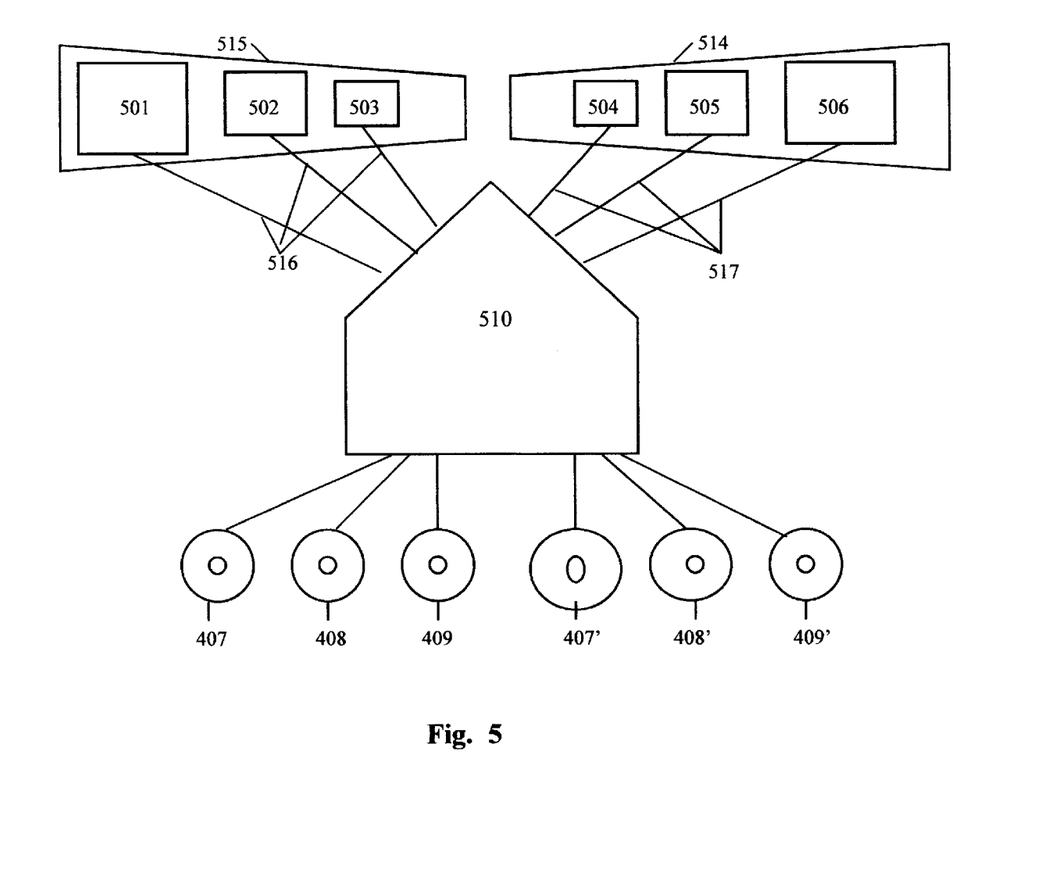
FIG. 5 is a schematic illustration of how the sectional images produced in FIG. 4 are then subsequently displayed for ultimate viewing of these edited images.

FIG. 5 shows, in schematic form, the process of displaying opposite perspective moving picture images. Simply, one starts with the sectional images 407, 408 and 409, as well as corresponding opposite sectional images designated 407', 408' and 409', and feeds these through a display control mechanism 510. This display controller 510 takes all the sectional images and simultaneously transmit them to left-side image display devices 501, 502 and 503 adjacent to one another as shown, and right-side image display devices 504, 505 and 506 similarly adjacent to one another as shown. The left side structure (e.g. video wall) into which the left side image display devices 501, 502 and 503 are built is designated by 515, while the right side (opposite) structure (video wall) into which the right side image display devices are built is designated by 514. These image display devices 501–506, can be any device suitable for display of the images, for example, large digital TVs, analog TVs, projection TVs, CRTs, or any other display device available now or in the future which is capable of displaying moving picture images in real-time with near-broadcast quality or better.

The display controller 510 has the hardware and software capability to accept, play, stop, synchronize, queue, pause and perform other functions on the plurality of media images 407, 408, 409 and 407', 408', 409', simultaneously. The controller transmits each media image to its corresponding image display screen and has the capabilities to manipulate them simultaneously and in synchronization. The connections between the controller and the individual image display devices are represented by 516 and 517. And, as was the case with earlier figures, FIG. 5 depicts a "logical" configuration for controlling the display which can be achieved by an unlimited variety of "physical" means obvious to a person of ordinary skill.

Again, while only three image display devices per side are shown in FIG. 5, it is contemplated by this disclosure and its associated claims that any number of a plurality of display devices can be used in this process.

Further, and again, while various intermediate "logical" media for recording images at different stages of the editing process are shown, e.g., 110, 111, 303, 315, 316, 407, 408, 409, 407', 408', 409', it is understood that one does not require a physically distinct storage device at each of these stages, and that one may in fact utilize a single storage device (or a smaller number of such devices) throughout the process, either by writing all versions of the edited data onto that device if the device has a large enough capacity to hold all of this data, or by overwriting earlier versions of edited data that are no longer needed.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A method for recording, editing and displaying motion-simulating moving pictures, comprising the steps of:

recording a moving picture image of a scene by orienting toward said scene, a moving picture image recording device capable of making a recording upon an associated moving picture image recording medium, and translating the image recording device in a direction substantially perpendicular to its recording orientation while the image recording device is recording said scene upon the recording medium;

editing as desired, a single master image recording of the moving picture image so-recorded on the recording medium;

splitting said single master image recording into a plurality of continuous, adjacent sectional image recordings; and displaying said adjacent sectional image recordings upon a plurality of substantially coplanar adjacent display devices, wherein each of said sectional image recordings is displayed on one of said display devices, and wherein any pair of adjacent sectional image recordings is correspondingly displayed on a pair of adjacent said display devices.

2. The method of claim 1, wherein:

said moving picture image recording device comprises a plurality of partial-scene moving picture image recording devices placed adjacent to one another, and oriented parallel to one another toward the entirety of said scene to be recorded; wherein each of the partial-scene recording devices records onto an associated partial-image moving picture image recording medium a partial-scene image recording of said scene; wherein the partial-scene recordings recorded by any two adjacent of the partial-scene recording devices are caused by virtue of the orientation and placement of the partial-scene recording devices to overlap and thereby contain duplicate recorded information, with respect to a relatively small edge region of said scene; and wherein said single master image is created by removing said duplicate recorded information as between every pair of adjacent partial scene recordings and then combining all remaining recorded information into a single, continuous recorded image of said scene.

3. The method of claim 1, further comprising the steps of:

recording a second moving picture image of a second scene by orienting toward said second scene, a second moving picture image recording device capable of making a second recording upon an associated second moving picture image recording medium, and translating the second image recording device in a direction substantially perpendicular to its recording orientation while the image recording device is recording said second scene upon the second recording medium;

editing as desired, a second single master image recording of the second moving picture image so-recorded on the second recording medium;

splitting said second single master image recording into a second plurality of continuous, adjacent sectional image recordings; and displaying said second plurality of adjacent sectional image recordings upon a second plurality of substantially coplanar adjacent display devices, wherein each recording among the second plurality of sectional image recordings is displayed on one of the display devices among the second plurality of said display devices, and wherein any pair of recordings among the second plurality of adjacent sectional image recordings is correspondingly displayed on a pair of adjacent said display devices among the second plurality of said display devices; wherein the plane of the second plurality of said display devices is non-coplanar with respect to the plane of the first plurality of said display devices such that the two said pluralities of display devices display their respective images on opposites side of, and with the display images oriented toward, an observer placed between the planes of the two said pluralities of display devices.

4. The method of claim 3, wherein the first and said second moving picture image recording devices are placed in a back-to-back alignment with respect to one another with recording orientations that differ from one another substantially one hundred eighty degrees, and are translated in fixed relationship to one another, such that the first and said second scenes respectively recorded thereby are opposite perspective view scenes.

5. The method of claim 3, wherein:

the first and said second moving picture image recording devices, respectively, comprise a first and second plurality of partial-scene moving picture image recording devices placed adjacent to one another and oriented parallel to one another within each said plurality of partial-scene moving picture image recording devices, and are respectively oriented toward the entirety of the first and said second scenes to be recorded by each said plurality of partial-scene moving picture image recording devices; wherein each of the partial-scene recording devices records onto an associated partial-image moving picture image recording medium a partial-scene image recording of one of said scenes; wherein the partial-scene recordings recorded by any two adjacent of the partial-scene recording devices within a plurality of partial-scene recording devices are caused by virtue of the orientation and placement of the partial-scene recording devices to overlap and thereby contain duplicate recorded information, with respect to a relatively small edge region of the corresponding one of said scenes; and wherein the first and said second single master images are created by removing said duplicate recorded information as between every pair of adjacent partial scene recordings, combining all remaining recorded information pertinent to the first scene into a single, continuous recorded image of said first scene, and combining all remaining recorded information pertinent to the second scene into a second, single, continuous recorded image of said second scene.

6. The method of claim 5, wherein the first and said second moving picture image recording devices are placed in a back-to-back alignment with respect to one another with recording orientations that differ from one another by substantially one hundred eighty degrees, and are translated in fixed relationship to one another, such that the first and said second scenes respectively recorded thereby are opposite perspective view scenes.

7. The method of claim 1, wherein editing said single master image recording of the moving picture image so-recorded on the recording medium, comprises enhancing the image recording for sharpness, color, synchronization and other aspects that create an optimal image for the desired viewing purpose.

8. The method of claim 1, wherein editing said single master image recording of the moving picture image so-recorded on the recording medium, comprises adding special effects to said image.

9. The method of claim 1, wherein editing said single master image recording of the moving picture image so-recorded on the recording medium, comprises adding advertising and service announcements to said image.

10. A system for recording, editing and displaying motion-simulating moving pictures, comprising:

a moving picture image recording device capable of making a recording upon an associated moving picture image recording medium;

moving picture editing means; and a plurality of substantially coplanar adjacent display devices; wherein a scene is recorded by orienting toward said scene said moving picture image recording device and translating the image recording device in a direction substantially perpendicular to its recording orientation while the image recording device is recording said scene upon the recording medium; wherein a single master image recording of the moving picture image so-recorded on the recording medium is edited using the editing means; wherein said single master image recording is split into a plurality of continuous, adjacent sectional image recordings; and wherein said adjacent sectional image recordings are displayed upon said plurality of substantially coplanar adjacent display devices, wherein each of said sectional image recordings is displayed on one of said display devices, and wherein any pair of adjacent sectional image recordings is correspondingly displayed on a pair of adjacent said display devices.

11. The system of claim 10, said moving picture image recording device further comprising a plurality of partial-scene moving picture image recording devices placed adjacent to one another, and oriented parallel to one another toward the entirety of said scene to be recorded; wherein each of the partial-scene recording devices records onto an associated partial-image moving picture image recording medium a partial-scene image recording of said scene; wherein the partial-scene recordings recorded by any two adjacent of the partial-scene recording devices are caused by virtue of the orientation and placement of the partial-scene recording devices to overlap and thereby contain duplicate recorded information, with respect to a relatively small edge region of said scene; and wherein said single master image is created by removing said duplicate recorded information as between every pair of adjacent partial scene recordings and then combining all remaining recorded information into a single, continuous recorded image of said scene.

12. The system of claim 10, further comprising:

a second moving picture image recording device capable of making a second recording upon an associated second moving picture image recording medium; and a second plurality of substantially coplanar adjacent display devices; wherein a second scene is recorded by orienting toward said second scene, said second moving picture image recording device, and translating the second image recording device in a direction substantially perpendicular to its recording orientation while the image recording device is recording said second scene upon the second recording medium;

a second single master image recording of the second moving picture image so-recorded on the second recording medium is edited using the editing means;

said second single master image recording is split into a second plurality of continuous, adjacent sectional image recordings; and said adjacent sectional image recordings among said second plurality of the sectional images is displayed upon a second plurality of substantially coplanar adjacent display devices, wherein each recording among the second plurality of sectional image recordings is displayed on one of the display devices among the second plurality of said display devices, and wherein any pair of recordings among the second plurality of adjacent sectional image recordings is correspondingly displayed on a pair of adjacent said display devices among the second plurality of said display devices; wherein the plane of the second plurality of said display devices is non-coplanar with respect to the plane of the first plurality of said display devices such that the two said pluralities of display devices display their respective images on opposites side of, and with the display images oriented toward, an observer placed between the planes of the two said pluralities of display devices.

13. The system of claim 12, wherein the first and said second moving picture image recording devices are placed in a back-to-back alignment with respect to one another with recording orientations that differ -from one another by substantially one hundred eighty degrees, and are translated in fixed relationship to one another, such that the first and said second scenes respectively recorded thereby are opposite perspective view scenes.

14. The system of claim 12, the first and said second moving picture image recording devices further comprising, respectively, a first and second plurality of partial-scene moving picture image recording devices placed adjacent to one another and oriented parallel to one another within each said plurality of partial-scene moving picture image recording devices, and respectively oriented toward the entirety of the first and said second scenes to be recorded by each said plurality of partial-scene moving picture image recording devices; wherein each of the partial-scene recording devices records onto an associated partial-image moving picture image recording medium a partial-scene image recording of one of said scenes; wherein the partial-scene recordings recorded by any two adjacent of the partial-scene recording devices within a plurality of partial-scene recording devices are caused by virtue of the orientation and placement of the partial-scene recording devices to overlap and thereby contain duplicate recorded information, with respect to a relatively small edge region of the corresponding one of said scenes; and wherein the first and said second single master images are created by removing said duplicate recorded information as between every pair of adjacent partial scene recordings, combining all remaining recorded information pertinent to the first scene into a single, continuous recorded image of said first scene, and combining all remaining recorded information pertinent to the second scene into a second, single, continuous recorded image of said second scene.

15. The system of claim 14, wherein the first and said second moving picture image recording devices are placed in a back-to-back alignment with respect to one another with recording orientations that differ from one another substantially one hundred eighty degrees, and are translated in fixed relationship to one another, such that the first and said second scenes respectively recorded thereby are opposite perspective view scenes.

16. The system of claim 10, wherein said single master image recording of the moving picture image so-recorded on the recording medium, is edited by enhancing the image recording for sharpness, color, synchronization and other aspects that create an optimal image for the desired viewing purpose.

17. The system of claim 10, wherein said single master image recording of the moving picture image so-recorded on the recording medium, is edited by adding special effects to said image.

18. The system of claim 10, wherein said single master image recording of the moving picture image so-recorded on the recording medium, is edited by adding advertising and service announcements to said image.

19. A method for recording, editing and displaying motion-simulating moving pictures, comprising the steps of:

removing duplicate overlapping recorded information as among a plurality of partially-overlapping and partially non-overlapping partial scene recordings of a scene;

combining all remaining non-duplicate recorded information into a single, continuous recorded master image of said scene;

editing as desired, the single master image recording;

splitting said single master image recording into a plurality of continuous, adjacent sectional image recordings; and displaying said adjacent sectional image recordings upon a plurality of substantially coplanar adjacent display devices, wherein each of said sectional image recordings is displayed on one of said display devices, and wherein any pair of adjacent sectional image recordings is correspondingly displayed on a pair of adjacent said display devices.

* * * * *